(12) United States Patent
Invie et al.

(10) Patent No.: US 9,164,195 B2
(45) Date of Patent: Oct. 20, 2015

(54) METHODS OF MAKING MICROSTRUCTURED OPTICAL FILMS COMPRISING BIPHENYL DIFUNCTIONAL MONOMERS

(71) Applicant: 3M INNOVATIVE PROPERTIES COMPANY, St. Paul, MN (US)

(72) Inventors: Judith M. Invie, Woodbury, MN (US); Bryan V. Hunt, Nowthen, MN (US); Kyle J. Lindstrom, Houlton, WI (US); David B. Olson, Marine on St. Croix, MN (US); Anthony M. Renstrom, Maplewood, MN (US); Clinton L. Jones, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 366 days.

(21) Appl. No.: 13/759,134

(22) Filed: Feb. 5, 2013

(65) Prior Publication Data

US 2013/0149495 A1    Jun. 13, 2013

Related U.S. Application Data

(63) Continuation of application No. 12/041,238, filed on Mar. 3, 2008, now abandoned.

(60) Provisional application No. 60/893,953, filed on Mar. 9, 2007.

(51) Int. Cl.
| | | |
|---|---|---|
| *G02B 1/04* | (2006.01) | |
| *C08F 20/06* | (2006.01) | |
| *C08F 20/30* | (2006.01) | |
| *C08K 3/22* | (2006.01) | |
| *C08F 20/38* | (2006.01) | |

(52) U.S. Cl.
CPC . *G02B 1/04* (2013.01); *C08F 20/06* (2013.01); *C08F 20/30* (2013.01); *C08F 20/38* (2013.01); *C08K 3/22* (2013.01); *C08K 2201/011* (2013.01); *Y10T 428/24355* (2015.01)

(58) Field of Classification Search
CPC .......... C08F 20/06; C08F 20/30; C08F 20/38; C08K 3/00; C08K 3/22; C08K 2201/011; C08K 2201/005; Y10T 428/24355
See application file for complete search history.

(56) References Cited

U.S. PATENT DOCUMENTS

| | | |
|---|---|---|
| 3,709,866 A | 1/1973 | Stoffey |
| 4,306,780 A | 12/1981 | Tarumi |
| 4,458,006 A | 7/1984 | Donges et al. |
| 4,518,756 A | 5/1985 | Yoshida et al. |
| 4,576,850 A | 3/1986 | Martens |
| 4,650,719 A | 3/1987 | Dien et al. |
| 4,814,362 A | 3/1989 | Billington |
| 5,169,915 A | 12/1992 | Mohri |
| 5,183,917 A | 2/1993 | Maruyama et al. |
| 5,334,681 A | 8/1994 | Mueller et al. |
| 5,453,452 A | 9/1995 | Nakayama et al. |
| 5,629,445 A | 5/1997 | Nakayama et al. |
| 5,716,740 A | 2/1998 | Shiba et al. |
| 5,908,874 A | 6/1999 | Fong |
| 5,932,626 A | 8/1999 | Fong |
| 5,998,499 A | 12/1999 | Klee |
| 6,107,364 A | 8/2000 | Fong |
| 6,147,137 A | 11/2000 | Jia |
| 6,730,156 B1 | 5/2004 | Windisch |
| 7,087,195 B2 | 8/2006 | Kawasaki |
| 7,156,911 B2 | 1/2007 | Kangas |
| 2002/0123589 A1 | 9/2002 | Olson et al. |
| 2005/0059766 A1 | 3/2005 | Jones |
| 2005/0151119 A1* | 7/2005 | Jones et al. ................. 252/299.1 |
| 2005/0261421 A1 | 11/2005 | Schmitt |
| 2006/0004166 A1 | 1/2006 | Olson |
| 2006/0128853 A1 | 6/2006 | Olson |
| 2006/0132945 A1 | 6/2006 | Sano |
| 2006/0210726 A1 | 9/2006 | Jones |
| 2006/0261318 A1 | 11/2006 | Morimoto |
| 2008/0009416 A1 | 1/2008 | Selph |
| 2008/0076745 A1 | 3/2008 | Endermann |

FOREIGN PATENT DOCUMENTS

| | | | |
|---|---|---|---|
| EP | 0109073 | 5/1984 | |
| EP | 126397 | 11/1984 | |
| EP | 1057808 | 6/2000 | |
| EP | 1455200 | 9/2004 | |
| JP | 59-86615 | 5/1984 | |
| JP | 60-197711 | 10/1985 | |
| JP | 61127712 | 6/1986 | |
| JP | 3021152 | 7/1993 | |
| JP | 07247306 | 9/1995 | |
| JP | 07247306 A * | 9/1995 | ............... C08F 2/48 |
| JP | 7-316245 | 12/1995 | |
| JP | 08-113616 | 5/1996 | |
| JP | 08-188625 | 7/1996 | |

(Continued)

OTHER PUBLICATIONS

English Translation of Kokubu et al ; JP 07-247306 A; Sep. 1995.*

(Continued)

*Primary Examiner* — Karuna P Reddy
(74) *Attorney, Agent, or Firm* — Carolyn A. Fischer

(57) ABSTRACT

A method of making optical films having a polymerized microstructured surface are described. The polymerized microstructured surface comprises the reaction product of a polymerizable resin composition comprising 10% to 100 wt-% of at least one biphenyl di(meth)acrylate monomer. The di(meth)acrylate monomer comprises a core biphenyl structure having two aromatic rings connected with a C—C bond. The biphenyl di(meth)acrylate monomer preferably comprises a sufficient amount of ortho and/or meta(meth)acrylate substituents such that the monomer is a liquid at 25° C.

13 Claims, No Drawings

(56) References Cited

FOREIGN PATENT DOCUMENTS

| | | |
|---|---|---|
| JP | 9-272707 | 10/1997 |
| JP | 1213211 | 8/1998 |
| JP | 11-116625 | 4/1999 |
| JP | 3397448 | 4/2003 |
| JP | 2004-182702 | 7/2004 |
| JP | 2004-231704 | 8/2004 |
| JP | 2004-323557 | 11/2004 |
| JP | 2005-272773 | 10/2005 |
| JP | 2005-283632 | 10/2005 |
| JP | 2008-247755 | 10/2008 |
| WO | 00/34804 | 6/2000 |
| WO | 2005/003822 | 1/2005 |
| WO | 2006/007286 | 1/2006 |
| WO | 2006/093075 | 9/2006 |
| WO | 2007/001811 | 1/2007 |

OTHER PUBLICATIONS

ChemBlink 4,4'-Bis(2-hydroxyethoxy)biphenyl [printed from the internet on Apr. 11, 2012], <http://www.chemblink.com/products/20994-26-7.htm>, 2 pages.

International Search Report, PCT/US2008/055641; Sep. 30, 2008; 5 pgs.

Trityl Methacrylate Formula, Retrieved from Website Chemical Book, Jan. 2014, 1 pg.

* cited by examiner

METHODS OF MAKING MICROSTRUCTURED OPTICAL FILMS COMPRISING BIPHENYL DIFUNCTIONAL MONOMERS

BACKGROUND

Certain microstructured optical products, such as described in U.S. Pat. Nos. 5,175,030 and 5,183,597, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized. Halogenated (e.g. brominated) monomers or oligomers are often employed to attain refractive indices of for example 1.56 or greater. Another way to attain high refractive index compositions is to employ a polymerizable organic composition that comprises high refractive index nanoparticles such as described in U.S. Publication Nos. 2006/0204745, 2006/0210726, 2006/0204676, and US 2006/0128853.

SUMMARY OF THE INVENTION

Presently described are optical films having a polymerized microstructured surface. The polymerized microstructured surface comprises the reaction product of a polymerizable resin composition comprising 10% to 100 wt-% of at least one biphenyl di(meth)acrylate monomer. The di(meth)acrylate monomer comprises a core biphenyl structure having two aromatic rings connected with a C—C bond. In one embodiment, the biphenyl di(meth)acrylate monomer is a liquid at 25° C. In another embodiment, the aromatic rings of the biphenyl di(meth)acrylate monomer comprise at least one (meth)acrylate substituent at an ortho or meta position.

The biphenyl di(meth)acrylate monomer has the general structure: $H_2C=(R1)C(O)—Ar—Ar—(O)C(R1)=CH_2$; wherein each Ar group is independently phenyl or napthyl and R1 is H or methyl.

A preferred class of biphenyl di(meth)acrylate monomers has the general structure

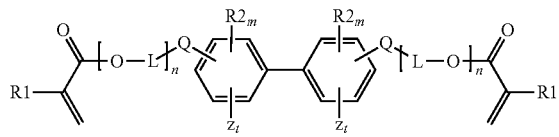

wherein each R1 is independently H or methyl;
each R2 is independently Br;
m ranges from 0 to 4;
each Q is independently O or S;
n ranges from 0 to 10;
L is a C2 to C12 alkylene group optionally substituted with one or more hydroxyl groups;
z is an aromatic ring;
t is independently 0 or 1; and
and at least one of the $-Q[L-O]nC(O)C(R1)=CH_2$ groups is substituted at the ortho or meta position.

DETAILED DESCRIPTION OF PREFERRED EMBODIMENTS

Presently described are optical films having a polymerized microstructured surface that comprises the reaction product of a polymerizable resin composition comprising certain polymerizable ethylenically unsaturated biphenyl monomers.

The polymerized microstructure can be an optical element or optical product constructed of a base layer and a polymerized microstructured optical layer. The base layer and optical layer can be formed from the same or different polymeric material. One preferred optical film having a polymerized microstructured surface is a brightness enhancing film.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The brightness enhancing film of the invention generally comprises a (e.g. preformed polymeric film) base layer and an optical layer. The optical layer comprises a linear array of regular right prisms. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from 70° to 120° and may range from 80° to 100°. These apexes can be sharp, rounded or flattened or truncated. For example, the ridges can be rounded to a radius in a range of 4 to 7 to 15 micrometers. The spacing between prism peaks (or pitch) can be 5 to 300 microns. For thin brightness enhancing films, the pitch is preferably 10 to 36 microns, and more preferably 18 to 24 microns. This corresponds to prism heights of preferably about 5 to 18 microns, and more preferably about 9 to 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to 1 mil (20-35 microns), a typical ratio of prism height to total thickness is generally between 0.2 and 0.4.

As described in Lu, U.S. Pat. No. 5,183,597 and Lu et al., U.S. Pat. No. 5,175,030 a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

In some embodiments, the polymerizable resin composition comprises surface modified inorganic nanoparticles. In such embodiments, "polymerizable composition" refers to the total composition, i.e. the organic component and surface modified inorganic nanoparticles. The "organic component" refers to all of the components of the composition except for the surface modified inorganic nanoparticles. Since the surface treatments are generally adsorbed or otherwise attached to the surface of the inorganic nanoparticles, the surface treatments are not considered a portion of the organic component. When the composition is free of inorganic material such as surface modified inorganic nanoparticles the polymerizable composition and organic component are one in the same.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of non-polymerizable (e.g. organic) solvent. The concentration of solvent can be determined by known methods, such as gas chromatography (as described in ASTM D5403). Solvent concentrations of less than 0.5 wt-% are preferred.

The components of the organic component are preferably chosen such that the organic component has a low viscosity. The viscosity of the organic component is less than 1000 cps and typically less than 900 cps. The viscosity of the organic component may be less than 800 cps, less than 700 cps, less than 600 cps, or less than 500 cps at the coating temperature. As used herein, viscosity is measured (at a shear rate up to 1000 sec-1) with 25 mm parallel plates using a Dynamic Stress Rheometer. Further, the viscosity of the organic component is typically at least 10 cps, more typically at least 50 cps at the coating temperature.

The coating temperature typically ranges from ambient temperature, 77° F. (25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic component is preferably a liquid at ambient temperature.

The biphenyl di(meth)acrylate monomer and/or the organic component has a refractive index of at least 1.55, 1.56, 1.57, 1.58, 1.59, or 1.60. The polymerizable composition including high refractive index nanoparticles can have a refractive index as high as 1.70. (e.g. at least 1.61, 1.62, 1.63, 1.64, 1.65, 1.66, 1.67, 1.68, or 1.69) High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning calorimetry (DSC), modulated DSC, or Dynamic Mechanical Analysis. The polymerizable composition can be polymerized by conventional free radical polymerization methods.

The presently described optical films are prepared from a polymerizable resin composition comprising at least one difunctional biphenyl monomer comprising polymerizable (meth)acrylate substituents. Such monomers comprise a biphenyl core structure wherein the two phenyl group are not fused, but joined by a single C—C bond. Such biphenyl monomers of interest do not contain any linking groups between the phenyl groups. Each of the phenyl groups have a substituent comprising a polymerizable (meth)acrylate or thio(meth)acrylate (e.g. end) group.

At least one of the aromatic rings comprises a (meth)acrylate substituent at an ortho or meta position. The biphenyl di(meth)acrylate monomer comprises a sufficient amount of ortho and/or meta(meth)acrylate substituents such that the monomer is a liquid at 25° C. In some embodiments, each (meth)acrylate group containing substituent is bonded to an aromatic ring group at an ortho or meta position. It is preferred that the biphenyl di(meth)acrylate monomer comprises a major amount of ortho(meth)acrylate substituents (i.e. at least 50%, 60%, 70%, 80%, 90%, or 95% of the substituents of the biphenyl di(meth)acrylate monomer). In some embodiments, each (meth)acrylate group containing substituent is bonded to an aromatic ring group at an ortho or meta position. As the number of meta- and particularly para-substituents increases, the viscosity of the organic components can increase as well. Further, para-biphenyl di(meth)acrylate monomers are solids at room temperature, with little solubility (i.e. less than 10%), even in phenoxyethyl acrylate and tetrahydrofurfuryl acrylate.

Biphenyl di(meth)acrylate monomers typically have the general structure

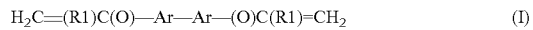

$$H_2C=(R1)C(O)—Ar—Ar—(O)C(R1)=CH_2 \qquad (I)$$

wherein each Ar group is independently phenyl or napthyl and R1 is H or methyl.

Preferably, at least one of the —(O)C(R1)=CH$_2$ groups is bonded to the Ar group at an ortho or meta position. Typically, each —(O)C(R1)=CH$_2$ group is bonded to the Ar group at the ortho or meta position. Most preferably, each —(O)C(R1)=CH$_2$ group is bonded to the Ar group at the ortho position. In some aspects, the biphenyl group is bonded directly to each (meth)acrylate or thio(meth)acylate group. In other embodiments, a linking group may be provided between the phenyl group and the (meth)acrylate group. For example, an alkoxy linking group wherein the carbon atoms are optionally substituted with hydroxyl may be provided between the phenyl group and the (meth)acrylate group. The linking group typically has a molecular (e.g. atomic) weight of less than 1200 g/mole. Preferably, the linking group is a C2-C3 alkoxy group optionally substituted with one or more hydroxyl groups.

In some embodiments, the monomer has the general structure

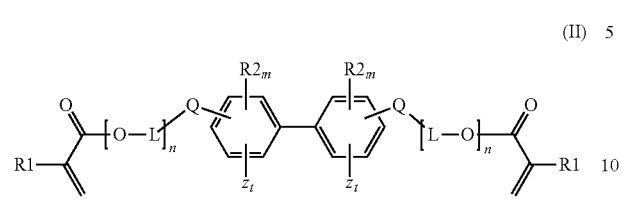
(II)

wherein each R1 is independently H or methyl;
each R2 is independently Br;
m ranges from 0 to 4;
each Q is independently O or S;
n ranges from 0 to 10;
L is a C2 to C12 alkylene group optionally substituted with one or more hydroxyl groups;
z is an aromatic ring;
t is independently 0 or 1; and
and at least one of the -Q[L-O]nC(O)C(R1)=CH$_2$ groups is substituted at the ortho or meta position. In some embodiments, each -Q[L-O]nC(O)C(R1)=CH$_2$ group is substituted at the ortho or meta position. In other embodiments, each -Q[L-O]nC(O)C(R1)=CH$_2$ group is substituted at the ortho position.

In some aspects, Q is preferably O. Further, n is typically 0, 1 or 2. L is typically $C_2$ or $C_3$. Alternatively, L is typically a hydroxyl substituted $C_2$ or $C_3$. In some embodiments, z is preferably fused to the phenyl group thereby forming a binapthyl core structure.

In some embodiments, it is preferred that the polymerized microstructured surface, the polymerizable resin composition, and the diphenyl monomers are substantially free (i.e. contain less than 1 wt-%) of bromine. In other embodiments, the total amount of bromine in combination with chlorine is less than 1 wt-%. In some aspects, the polymerized microstructured surface or the optical film, the polymerizable resin composition, and the triphenyl monomers are substantially non-halogenated (i.e. contain less than 1 wt-% total of bromine, chlorine, fluorine and iodine).

Some specific monomers having such general structure are depicted as follows:

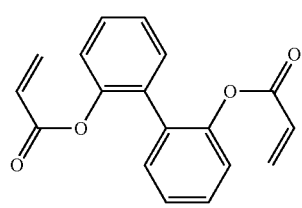
(III)

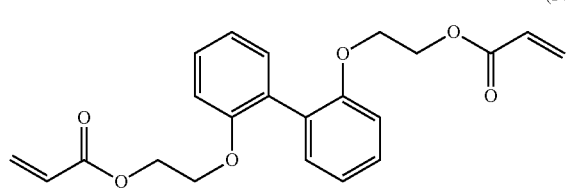
(IV)

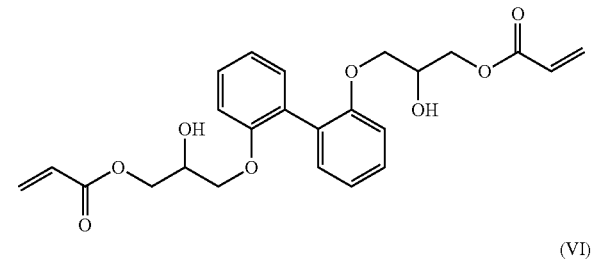
(V)

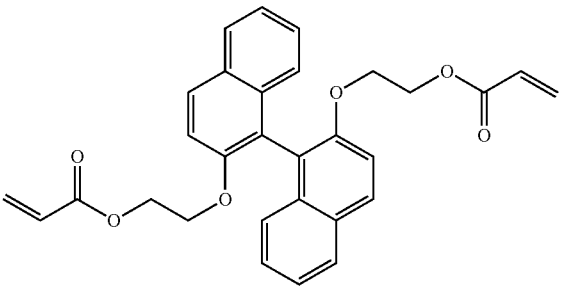
(VI)

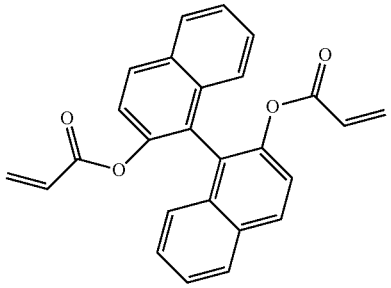
(VII)

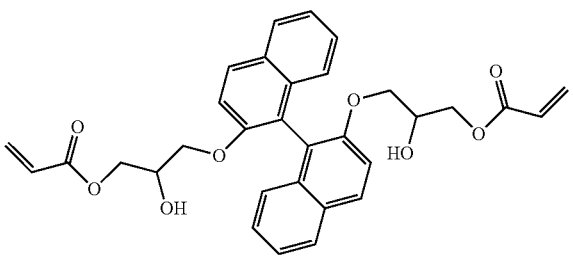
(VIII)

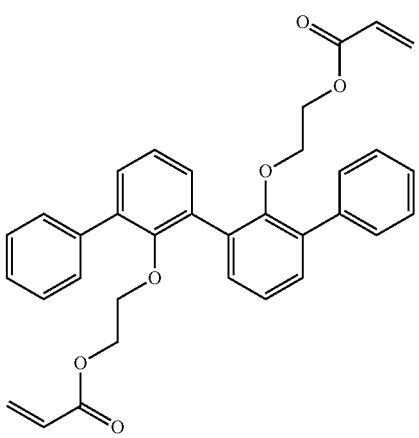
(IX)

Suitable synthesis of the above molecules in accordance with structures III and IV is described in the forthcoming examples. Biphenyl di(meth)acrylate monomers in accordance with structure V can be prepared by reacting 2,2'-dihydroxybiphenyl with epichlorohydrin to give the di-ether epoxide, and then reacting this intermediate with acrylic acid in the presence of a catalyst to give the final monomer. Each of the binapthyl molecules (e.g. structures VI-VIII) can be prepared in an analogous synthesis using 2,2'-dihydroxy-1,1'-binaphthyl as the starting material rather than 2,2'-dihydroxybiphenyl. Other synthesis could be employed by one of ordinary skill in the art.

The organic component comprises one or more biphenyl di(meth)acrylate monomers in an amount of at least 10 wt-%, 15 wt-%, 20 wt-%, 25 wt-%, 30 wt-%, 35 wt-%, or 40 wt-%. Although the organic component may consist solely of one or more biphenyl di(meth)acrylate monomer, it is typically preferred to combine at least one biphenyl di(meth)acrylate monomer with a second (i.e. different) difunctional (meth) acrylate monomer or oligomer. In this embodiment, the organic component typically comprises no greater than 75 wt-% of biphenyl di(meth)acrylate monomer(s).

The organic component preferably comprises at least 5 wt-%, 10 wt-%, 15 wt-%, 20 wt-%, and preferably 25 wt-% of a second (i.e. different) difunctional (meth)acrylate monomer or oligomer. The total amount of other difunctional (meth) acrylate monomers typically does no exceed 75 wt-%. The organic component preferably comprises one or more aromatic difunctional (meth)acrylate monomers that do not contain a biphenyl group wherein the aromatic rings are joined by a C—C bond.

In one embodiment, the polymerizable composition comprises an aromatic difunctional meth)acrylate monomer that comprises a major portion having the following general structure:

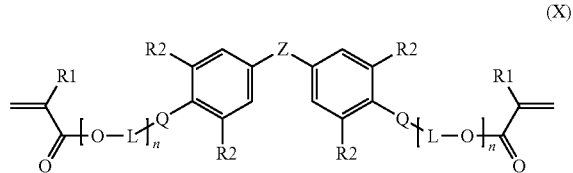

(X)

wherein each R1 is independently hydrogen or methyl. Each R2 is independently hydrogen or bromine. Z is —C(CH$_3$)$_2$—, —CH$_2$—, —C(O)—, —S—, —S(O)—, or —S(O)$_2$—, and each Q is independently O or S. Typically, the R1 groups are the same. Typically, the R2 groups are the same as each other well. L-0 is a linking group. L may independently comprise a branched or linear C$_2$-C$_{12}$ alkylene group (i.e. C$_2$, C$_3$, C$_4$, C$_5$, C$_6$, C$_7$, C$_8$, C$_9$, C$_{10}$, C$_{11}$, or C$_{12}$). Further, the carbon atoms of the alkylene group may optionally be substituted with one or more hydroxyl groups. For example L may be —CH$_2$CH(OH)CH$_2$—. Typically, the linking groups are the same. Preferably the alkylene group comprises no more than 8 carbon atoms and more preferably no more than 6 carbon atoms. Each n can ranges from 0-10. Each n is preferably at least 1. The linking group typically has a molecular weight of less than 1200 g/mole. Preferably, the linking group is a C2-C3 alkoxy group optionally substituted with one or more hydroxyl groups.

The di(meth)acrylate monomer may be synthesized or purchased. As used herein, major portion refers to at least 60-70 wt-% of the monomer containing the specific structure(s) just described. It is commonly appreciated that other reaction products are also typically present as a byproduct of the synthesis of such monomers. The di(meth)acrylate monomer can be the reaction product of Tetrabromobisphenol A diglycidyl ether and acrylic acid. Such monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy(2-hydroxy-3,1-propanediyl)] ester.

Alternatively or in addition to, the organic component may comprise one or more (meth)acrylated aromatic epoxy oligomers. For example, (meth)acrylated aromatic epoxy, (described as a modified epoxy acrylates), are available from Sartomer, Exton, Pa. under the trade designation "CN104", "CN120", "CN118", "CN115" and "CN112C60". (Meth) acrylated aromatic epoxy oligomer, (described as an epoxy acrylate oligomer), is available from Sartomer under the trade designation "CN2204". Further, an (meth)acrylated aromatic epoxy oligomer, (described as an epoxy novolak acrylate blended with 40% trimethylolpropane triacrylate), is available from Sartomer under the trade designation "CN112C60".

In some embodiments, the aromatic epoxy acrylate is derived from bisphenol A, such as those of the structure previously described. In other embodiments, the aromatic epoxy acrylate is derived from a different monomer than bisphenol A.

One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

In one embodiment, the polymerizable resin composition comprises 25 wt-% to 75 wt-% of one or more biphenyl di(meth)acrylate monomers having (meth)acrylate substituents at an ortho or meta position; and 25 wt-% to 75 wt-% of one or more bisphenol A di(meth)acrylate monomers.

The organic component optionally comprises one or more monofunctional diluent in an amount up to about 40 wt-% of the total organic component.

Preferred diluents can have a refractive index greater than 1.50 (e.g. greater than 1.55. Such reactive diluents can be halogenated or non-halogenated (e.g. non-brominated).

Suitable reactive diluents include for example phenoxy ethyl(meth)acrylate; phenoxy-2-methylethyl(meth)acrylate; phenoxyethoxyethyl(meth)acrylate, 3-hydroxy-2-hydroxypropyl(meth)acrylate; benzyl(meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

A preferred diluent is phenoxy ethyl(meth)acrylate, and in particular phenoxy ethyl acrylate (PEA). Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Another preferred diluent is phenylthio ethyl acrylate (PTEA) also commerically available from Cognis.

Another class of high refractive index diluents include monofunctional biphenyl monomers that comprise a terminal biphenyl group, wherein the two phenyl groups are not fused, but joined by a bond or a terminal group comprising two aromatic groups joined by a linking group (e.g. Q). For example, when the linking group is methane, the terminal group is a biphenylmethane group. Alternatively, wherein the linking group is —(C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred.

In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or biphenyl thio(meth) acrylate monomer may further comprise a (e.g. 1 to 5 carbon) alkyl group optionally substituted with one or more hydroxyl groups. An exemplary species of this type is 2-phenyl-2-phenoxyethyl acrylate.

In one embodiment, a monofunctional biphenyl(meth) acrylate monomer is employed having the general formula:

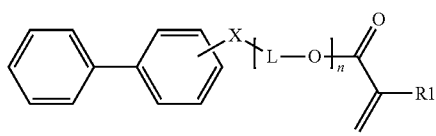

wherein R1 is H or CH$_3$;
X is O or S;
n ranges from 0 to 10 (e.g. n is 1, 2, 3, 4, 5, 6, 7, 8, 9, or 10); and
L is an alkylene group having 1 to 5 carbon atoms (i.e. methylene, ethylene, propylene, butylene, or pentylene), optionally substituted with hydroxy.

In another embodiment, the monofunctional biphenyl (meth)acrylate monomer has the general formula:

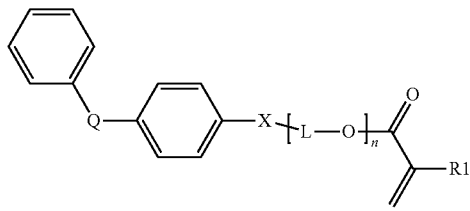

wherein R1 is H or CH$_3$;
X is O or S;
Q is selected from —(C(CH$_3$)$_2$—, —CH$_2$—, —C(O)—, —S(O)—, and —S(O)$_2$—;
n ranges from 0 to 10 (e.g. n is 1, 2, 3, 4, 5, 6, 7, 8, 9, or 10); and
L is an alkylene group having 1 to 5 carbon atoms (i.e. methylene, ethylene, propylene, butylene, or pentylene), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", and 2-phenyl-2-phenoxyethyl acrylate, available under the trade designation "TO-1463".

Various combinations of aromatic monofunctional (meth) acrylate monomers can be employed. For example, a (meth) acrylate monomer comprising a phenyl group may be employed in combination with one or more (meth)acrylate monomers comprising a biphenyl group. Further, two different biphenyl(meth)acrylate monofunctional monomera may be employed.

The polymerizable resin may optionally comprise up to 35 wt-% of various other non-halogenated ethylenically unsaturated monomers. For example, when the (e.g. prism) structures are cast and photocured upon a polycarbonate preformed polymeric film the polymerizable resin composition may comprise one or more N,N-disubstituted (meth)acrylamide monomers. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

The polymerizable resin composition may also optionally comprise up to 20 wt-% of a non-aromatic crosslinker that comprises at least three (meth)acrylate groups. Suitable crosslinking agents include for example pentaerythritol tri(meth)acrylate, pentaerythritol tetra(meth)acrylate, trimethylolpropane tri(methacrylate), dipentaerythritol penta(meth) acrylate, dipentaerythritol hexa(meth)acrylate, trimethylolpropane ethoxylate tri(meth)acrylate, glyceryl tri (meth)acrylate, pentaerythritol propoxylate tri(meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

The organic component may optionally comprise at least one (e.g. non-halogenated) crosslinker that comprise at least three (meth)acrylate groups. Suitable crosslinking agents include for example pentaerythritol tri(meth)acrylate, pentaerythritol tetra(meth)acrylate, trimethylolpropane tri(meth-acrylate), dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

Various crosslinkers are commercially available. For example, pentaerythritol triacrylate (PETA) is commercially available from Sartomer Company, Exton, Pa. under the trade designation "SR444"; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) is commercially available from Sartomer Company under the trade designations "SR351". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

The crosslinking agent may be present in the polymerizable composition in an amount of at least about 2 wt-%. Typically, the amount of crosslinking agent is not greater than about 25 wt-%. The crosslinking agent may be present in any amount ranging from about 5 wt-% and about 15 wt-%.

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The biphenyl di(meth)acrylate monomers just described are particularly useful in preparing non-halogenated high refractive index polymerizable organic compositions. In some embodiments, the compositions are free of inorganic nanoparticles.

In other embodiments, the polymerizable composition further comprises inorganic nanoparticles.

Surface modified (e.g. colloidal) nanoparticles can be present in the polymerized structure in an amount effective to enhance the durability and/or refractive index of the article or optical element. The total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). The nanoparticles can include metal oxides such as, for example, alumina, zirconia, titania, mixtures thereof, or mixed oxides thereof. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in Published U.S. Patent Application No. 2006/0148950; incorporated herein by reference. The nanoparticles are surface modified. Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface-modified to improve compatibility with the organic matrix material. The surface-modified nanoparticles are often non-associated, non-agglomerated, or a combination thereof in an organic matrix material. The resulting light management films that contain these surface-modified nanoparticles tend to have high optical clarity and low haze. The addition of the high refractive index surface-modified nanoparticles, such as zirconia, can increase the gain of brightness enhancement film compared to films that contain only polymerized organic material.

The monocarboxylic acid surface treatments preferably comprise a compatibilizing group. The monocarboxylic acids may be represented by the formula A-B where the A group is a (e.g. monocarboxylic acid) group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymerizable resin of the (e.g. brightness enhancing) optical article. The compatibilizing group B can be reactive or nonreactive and can be polar or non-polar.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

The compatibilizing group B may optionally be reactive such that it can copolymerize with the organic matrix of the (e.g. brightness enhancing) optical article. For instance, free radically polymerizable groups such as (meth)acrylate compatibilizing groups can copolymerize with (meth)acrylate functional organic monomers to generate brightness enhancement articles with good homogeneity.

Suitable surface modifications are described in U.S. Publication No. 2007/0112097 and U.S. Ser. No. 60/891,812, filed Feb. 27, 2007; incorporated herein by reference.

The surface modified particles can be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in the U.S. Pat. No. 7,074,463; incorporated herein by reference. The microstructured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns, which can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed component suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696.

A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

A common way of measuring the effectiveness of such recycling of light is to measure the gain of an optical film. As used herein, "relative gain", is defined as the on-axis luminance, as measured by the test method described in the examples, when an optical film (or optical film assembly) is placed on top of the light box, relative to the on-axis luminance measured when no optical film is present on top of the light box. This definition can be summarized by the following relationship:

$$\text{Relative Gain} = (\text{Luminance measured with optical film}) / (\text{Luminance measured without optical film})$$

In one embodiment, an optical film comprising a light transmissive (e.g. cured) polymeric material having a microstructured surface is described. The optical film is a substantially non-polarizing film having a single sheet relative gain of at least 1.60. The relative single sheet gain is typically no greater than 2.05. Accordingly, the single sheet relative gain may also range from any values in the set of relative gain values including 1.65, 1.70, 1.75, 1.80, 1.85, and 1.90 or greater.

In other embodiments, the inventions relate to various assemblies that comprise or consist of two or more films. Each assembly includes a first microstructured optical film proximate a second (e.g. microstructured or unstructured) optical film.

By proximate, it is meant sufficiently near. Proximate can include the first microstructured optical film being in contact with the second optical film such as by the films merely being stacked together or the films may be attached by various means. The films may be attached by mechanical means, chemical means, thermal means, or a combination thereof. Chemical means includes various pressure sensitive, solvent-based, and hot melt adhesives as well as two-part curable adhesive compositions that crosslink upon exposure to heat, moisture, or radiation. Thermal means includes for example a heated embossed roller, radio frequency (RF) welding, and ultrasonic welding. The optical films may be attached (e.g. continuously) across the entire plane of the films, at only select points, or at only the edges. Alternatively, the proximate optical films may be separated from each other with an air interface. The air interface may be created by increasing the thickness of either or both optical films at the periphery, such as by application of an adhesive. When the films are stacked rather than laminated together, the air interface between the optical films may be only a few microns.

In some embodiments, a first microstructured optical film is proximate a second microstructured optical film. In such assemblies, the microstructured surface of the bottom film is preferably disposed proximate the unstructured surface of the top film. For embodiments that employ prismatic microstructured films, the prisms of the films are generally aligned parallel in one principal direction, the prisms being separated by grooves. It is generally preferred to align the prisms (or grooves) of the second (e.g. bottom) microstructured optical film in a stack such that the prisms are substantially orthogonal to the prisms of the first (e.g. top) film. However, other alignments can also be employed. For example, the prisms of the second optical film may be positioned relative to the prisms of the second optical film such that the intersection of grooves or prisms form angles ranging from about 70° to about 120°.

In one embodied assembly, a first microstructured substantially non-polarizing optical film is proximate a second microstructured substantially non-polarizing optical film. The gain of this assembly is at least 2.50. The first optical film may be the same as or different than the second optical film. For example, the second film may have a different base layer composition, a different microstructured surface composition, and/or may have a different surface microstructure. The relative gain of this assembly is typically less than 3.32. Accordingly, the relative gain of such assembly may also range from any values in the set of relative gain values including 2.55, 2.60, 2.65, 2.70, 2.75, 2.80, 2.85, 2.90, 2.95, and 3.00 or greater.

For the following defined terms, these definitions shall be applied, unless a different definition is given in the claims or elsewhere in this specification.

The term "microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be plano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer or Bausch and Lomb Refractometer (CAT No. 33.46.10) in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

"Aggregation" refers to a strong association between primary particles that may be chemically bound to one another. The breakdown of aggregates into smaller particles is difficult to achieve.

"Agglomeration refers to a weak association between primary particles which may be held together by charge or polarity and can be broken down into smaller entities.

"Primary particle size" refers to the mean diameter of a single (non-aggregate, non-agglomerate) particle.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Synthesis of Biphenyl Di(Meth)Acrylate Monomers

1. Preparation of 2,2'-dihydroxyethoxy-biphenyl

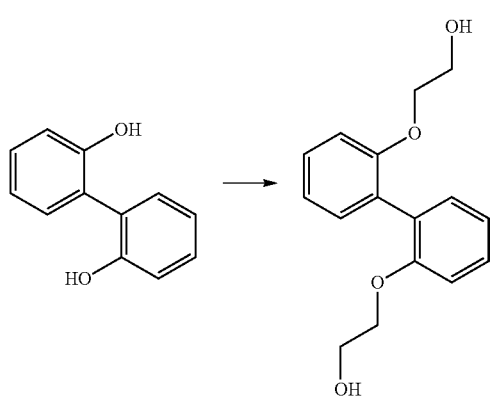 [SMILES: Oc1ccccc1-c1ccccc1O ; OCCOc1ccccc1-c1ccccc1OCCO]

To a 2000 ml 3 neck round bottom equipped with an overhead stirrer, temperature probe, heating mantel was added 2,2'-dihydroxy-biphenyl (500 g, 2.68 mole, 1.0 eq), ethylene carbonate (520.2 g, 5.9 mole, 2.2 eq.), potassium iodide (5 g, 0.03 mole, 0.01 eq.), N,N-dimethyl formamide (DMF) (47 g, 50 ml) and heated to 150° C. The reaction was monitored by GC and after 4 hours the reaction was complete. The reaction was cooled to 40° C., added 1000 ml ethyl acetate and washed 3 times with 500 ml sodium chloride brine. The ethyl acetate was dried over $MgSO_4$, filtered and concentrated in vacuo to recover a dark brown product (736 g, 99%).

2. Preparation of 2,2'-diethoxy-biphenyl diacrylate ("BPDA-1")

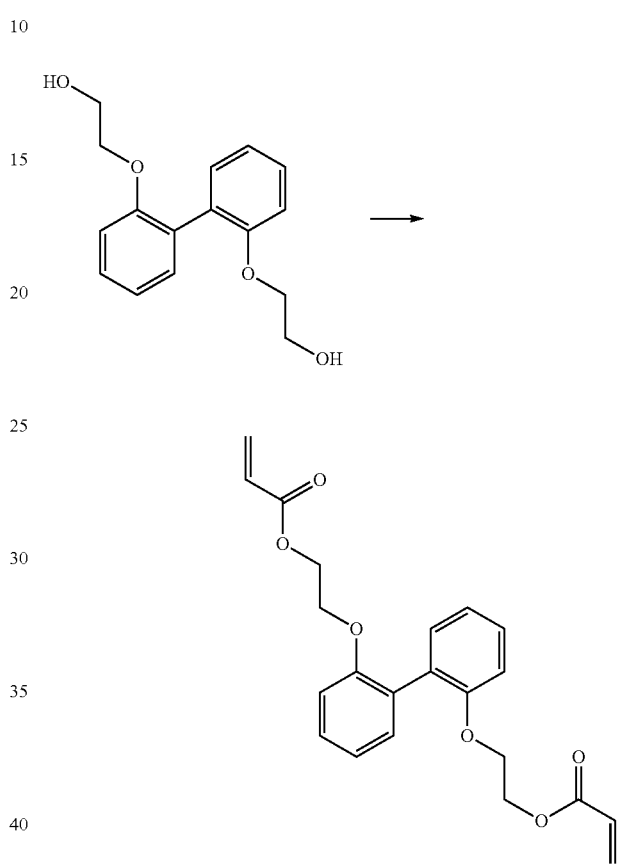

To a 2000 ml 3 neck round bottom equipped with an overhead stirrer, dean stark trap and temperature probe was added 2,2'-dihydroxyethoxy-biphenyl (368 g, 1.34 mole, 1.0 eq.), toluene (700 g), Prostab 5198 (0.023 g), aluminum N-nitrosophenylhydroxylamine (NPAL) (0.059 g), manganese acetate (0.023 g), acrylic acid (212.7 g, 2.95 mole, 2.2 eq), p-toluene sulfonic acid (pTSA, 23.1 g, 0.13 mole, 0.1 eq.) and heated to reflux. After 2.5 hours the reaction stalled with ~45/45 product/intermediate and 10% starting material. The reaction was treated with acrylic acid (26 g) and pTSA (5 g) and continued refluxing. No additional conversion to product was observed. Acrylic acid (50 g) and methane sulfonic acid (5 g) were added. The Dean stark trap continued to collect water. Upon running the reaction overnight the product was ~75% product and 7% mono acrylate. The reaction was washed 3 times with sodium chloride brine (200 ml), 3 times with brine with some 1N NaOH (200 ml), 3 times with sat. sodium carbonate (200 ml), dried over $MgSO_4$ (5 g), filtered and concentrated in vacuo to recover the product. The product (500 g) was purified by series of 3 columns eluting with 50% hexane/chloroform to recover 220 g product at 92% purity (GC) and 3 other fractions of lesser purity. The refractive index of the (i.e. uncured) monomer was determined to be 1.559.

3. Preparation of 2,2'-biphenyl diacrylate ("BPDA-2")

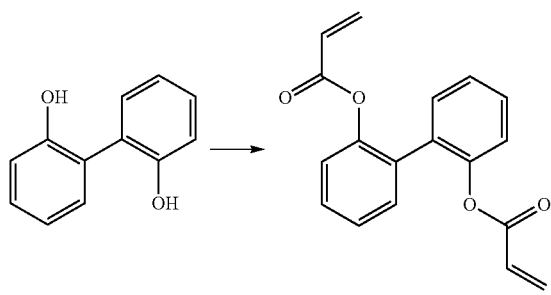 [SMILES: Oc1ccccc1-c1ccccc1O ; C=CC(=O)Oc1ccccc1-c1ccccc1OC(=O)C=C]

To a 1000 ml 3 neck round bottom equipped with an overhead stirrer and temperature probe was added 2,2'-dihydroxybiphenyl (50 g), Prostab 5198 (0.02 g), DMF (150 ml) and triethylamine (59.8 g). The reaction was cooled to <0 C with methanol/dry ice bath and acryloyl chloride (51 g) was slowly added. The GC indicated the reaction was mostly complete with ~15% monoacrylate. Triethylamine (10 g) was added followed by the addition of acryloyl chloride (9 g). The GC indicated the reaction was complete. The reaction product was treated with (300 ml) methyl t-butyl ether and (300 ml) DI water. The organic portion was separated and washed 5 times with 200 ml sodium chloride brine. The organic portion was treated with 50 g filter aid, mixed and filtered through a thin pad of silica gel. The filtrate was concentrated in vacuo to recover a yellow oil. This oil (69 g) was taken up in 300 ml chloroform and filtered through a short silica gel column (5.5 inch diameter by 4 inches thick) and eluted with chloroform/heptane. The product (52 g) was recovered by concentrating the eluent in vacuo. GC indicated >98% product. The refractive index of the (i.e. uncured) monomer was determined to be 1.571.

Polymerizable Resin Compositions

Polymerizable Resin Composition 1:

50 parts of BPDA-2, 25 parts CN120 (epoxy acrylate available from Sartomer Company, Exton, Pa., reported by Sartomer to have a viscosity of 2150 cps at 25° C., a refractive index of 1.5556 and a Tg of 60° C.), 25 parts SR601 (ethoxylated bisphenol A diacrylate available from Sartomer Company reported to have a viscosity of 1080 cps at 25° C., a refractive index of 1.5340 and a Tg of 60° C.) and 0.6 parts Darocur 4265 (available from Ciba Specialty Chemicals, Tarrytown, N.Y.) were mixed together thoroughly in an amber jar. The refractive index of this resin composition was measured to be 1.560.

Polymerizable Resin Composition 2:

50 parts of BPDA-1, 25 parts CN120, 25 parts SR601 and 0.6 parts Darocur 4265 were mixed together thoroughly in an amber jar. The refractive index of this resin composition was measured to be 1.553.

Polymerizable Resin Composition 3:

50 parts of BPDA-1, 50 parts CN120, and 0.6 parts Darocur 4265 were mixed thoroughly in an amber jar. The refractive index of this resin composition was measured to be 1.558.

Optical Film Sample Preparation for Polymerizable Resin Compositions 1-3:

Brightness enhancing films samples were made using Polymerizable Resin Compositions 1-3. About 3 grams of warm resin was applied to a 2 mil primed PET (polyester) film, available from DuPont under the trade designation "Melinex 623" and placed against a microstructured tool with a 90/24 pattern similar to the commercially available Vikuiti TBEF-90/24. The PET, resin and tool were passed through a heated laminator set at approximately 150° F. to create a uniformly thick sample. The tool containing the film and coated resin sample was passed at 30 fpm through a Fusion UV processor containing two 600 W/10 in D-bulbs to cure the film. The PET and cured resin were removed from the tool and cut into samples. The test methods used to evaluate the films are as follows:

$ZrO_2$ Sols

The $ZrO_2$ sols used in the examples had the following properties (as measured according to the Photo Correlation Spectroscopy (PCS), X-Ray Diffraction and Thermal Gravimetric Analysis methods described in Published U.S. Patent Application No. 2006/0204745 and U.S. patent application Ser. No. 11/078,468):

| PCS Data | | | |
|---|---|---|---|
| Dispersion Index | Intensity avg size (nm) | Volume- avg size (nm) | (Intensity- avg)/(Volume- avg) |
| 1.0-2.4 | 23.0-37.0 | 8.0-18.8 | 1.84-2.97 |

| Relative Intensities | | Apparent Crystallite Size (nm) | | | | | Weighted Avg |
|---|---|---|---|---|---|---|---|
| Cubic/ Tetragonal | Mono- clinic | (C, T) (1 1 1) | M (−1 1 1) | M (1 1 1) | Avg M Size | % C/T | XRD Size |
| 100 | 6-12 | 7.0-8.5 | 3.0-6.0 | 4.0-11.0 | 4.5-8.3 | 89%-94% | 7.0-8.4 |

% C/T = Primary particle size

The preparation of $ZrO_2$ sols is described in Published U.S. Patent Application No. 2006/0204745 and U.S. patent application Ser. No. 11/078,468, filed Mar. 11, 2005.

Polymerizable Resin Composition 4

ZrO2 sol (500 g at 40.87% solids), succinic acid mono-[2-(2-methoxy-ethoxy)-ethyl]ester (43.2 g @ 50% solids in 1-methoxy-2-propanol), 1-methoxy-2-propanol (345 g), succinic acid mono-(2-acryloyloxy-ethyl) ester (62.6 g @ 50% solids in 1-methoxy-2-propanol), a 50/50 blend of 2-phenylphenyl acrylate/diethoxy biphenyl diacrylate (BPDA-1) (128.3 g) and ProStab 5198 (0.08 g) were charged to a 3 neck 2 L RB flask. Water and alcohol were removed via vacuum distillation such that the resultant dispersion was approximately 53.0% ZrO2 in acrylate resin. The refractive index of the final blend was measured at 1.657 using a Bausch and Lomb Refractometer (CAT No. 33.46.10). 28.4 g of the resin blend was added to an amber jar. 0.71 g of SR 238 (HDODA available from Sartomer Co.) and 0.14 g of Darocure 1173 were also added to the amber jar and mixed thoroughly. The refractive index of the blended resin was measured at 1.647.

Optical Film Sample Preparation for Polymerizable Resin Compositions 4:

An 8"×11" metal master consisting of linear rows of 90 degree prisms with a nominal pitch spacing of 50 microns, similar to the prism geometry pattern found on Vikuiti BEF II (commercially available from 3M Co., St. Paul, Minn.), was placed on a hot plate and heated to 140° F. A 4 ml bead of the polymerizable resin from either example 1 or example 2, respectively, was applied to the master tool using a disposable pipette. Next, a 500 gauge PET available from Dupont Teijin Films as MELINEX 623 was placed on the bead of resin and master tool.

The PET film was oriented so the linear prisms are oriented approximately perpendicular (90°+/−20°) to the high gain axis of the film. The master tool, resin and PET were then passed through a heated nip roll at 160° F. with sufficient force for the resin to fill the master tool completely, while eliminating any entrained air. The filled master tool was then exposed to ultraviolet radiation from a "D-bulb" using a 600 W/in. variable power supply available from Fusion UV Systems, Inc. Gaithersburg, Md. at a linespeed of 50 fpm for two passes. The PET film was then manually removed from the master tool. The prismatic coating formed on the PET film resulted in a coating thickness of approximately 25 microns.

Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m². The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

$$\text{Sphere brightness ratio} = 1/(1 - R\text{sphere} * R\text{standard})$$

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

$$\text{Sphere brightness ratio} = 1/(1 - R\text{sphere} * R\text{sample})$$

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

The single sheet gain is tested in the vertical (or perpendicular orientation relative to the front face of the diffuser boxed used in the E.T. Tester). In the horizontal, or crossed sheet configuration, the bottom sheet of the film stack is in the vertical orientation and the top sheet is horizontal or parallel to the front face of the diffuser box.

Table 1 as follows depicts the test results of the optical films. The gain in brightness achieved from these films was surprisingly high, when using the monomers and resin compositions of the present invention.

TABLE 1

| Polymerizable Resin Composition | Single Sheet Gain | Crossed Sheet Gain |
| --- | --- | --- |
| 1 | 1.63 | 2.59 |
| 2 | 1.63 | 2.56 |
| 3 | 1.61 | 2.62 |
| 4 | 1.80 | 2.97 |

What is claimed is:

1. A method of making a microstructure-bearing article comprising
    (a) providing a substantially solvent free polymerizable resin composition comprising
        at least 10 wt-% of biphenyl di(meth)acrylate monomer having the general structure

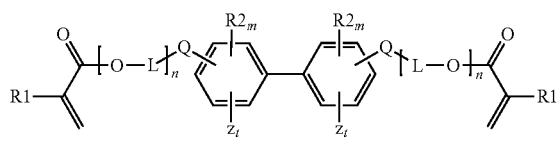

wherein each R1 is independently H or methyl;
each R2 is independently Br;
m ranges from 0 to 4;
each Q is independently O or S;
n ranges from 0 to 10;
L is a C2 to C12 alkylene group optionally substituted with one or more hydroxyl groups;
z is a fused aromatic ring;
t is 1;
and at least one of the -Q[L—O]n C(O)C(R1)=CH$_2$ groups is substituted at an ortho position;
  one or more aromatic monofunctional (meth)acrylate monomer diluents or a crosslinking agent or a combination thereof; and
  at least 10 wt-% of inorganic nanoparticles;
(b) depositing the polymerizable composition onto a master negative microstructured molding surface;
(c) filling the cavities by moving a bead of the polymerizable composition between a preformed base and the master; and
(d) curing the composition.

2. The method of claim 1 wherein the biphenyl di(meth)acrylate monomer is a liquid at 25° C.

3. The method of claim 1 wherein the biphenyl di(meth)acrylate monomer has a refractive index of at least 1.55.

4. The method of claim 1 wherein the biphenyl di(meth)acrylate monomer is non-halogenated.

5. The method of claim 1 wherein Q is O.

6. The method of claim 1 wherein n is 0, 1 or 2.

7. The method of claim 1 wherein L is C2 or C3.

8. The method of claim 1 wherein L is a hydroxyl substituted C2 or C3.

9. The method of claim 1 wherein the polymerizable resin comprises at least 40 wt-% of inorganic nanoparticles.

10. The method of claim 1 wherein the inorganic nanoparticles comprise zirconia.

11. The method of claim 1 wherein the polymerizable resin comprises at least 40 wt-% of zirconia nanoparticles.

12. The method of claim 1 wherein the polymerizable resin comprises an aromatic difunctional (meth)acrylate monomer or oligomer that does not contain a biphenyl group.

13. The method according to claim 1 wherein the polymerizable resin composition is non-halogenated.

* * * * *